United States Patent
Kushner

[15] 3,679,331
[45] July 25, 1972

[54] METERING PUMP AND VALVE
[72] Inventor: Jack Kushner, Lindenhurst, N.Y.
[73] Assignee: Delta Scientific Corporation, Lindenhurst, N.Y.
[22] Filed: April 24, 1970
[21] Appl. No.: 31,686

[52] U.S. Cl.................................417/477, 222/214, 417/478, 417/479
[51] Int. Cl.......................................................F04b 43/08
[58] Field of Search .........................222/206, 209, 214, 215; 417/474, 475, 426, 477, 478, 479; 137/515.5

[56] References Cited
UNITED STATES PATENTS
2,922,379  1/1960  Schultz..............................417/475 X
857,897  6/1907  Patterson............................137/515.5
3,359,910  12/1967  Latham.................................417/426

Primary Examiner—Robert B. Reeves
Assistant Examiner—Francis J. Bartuska
Attorney—Pennie, Edmonds, Morton, Taylor and Adams

[57] ABSTRACT

A metering pump and valve combination is disclosed wherein means are provided for pumping discrete quantities of fluid such as might be used as samples for analysis. The pump includes a resilient tube which is flexed in a traverse direction in a manner which precludes exceeding the elastic limit of the tube.

2 Claims, 3 Drawing Figures

INVENTOR.
JACK KUSHNER

BY Pennie Edmonds
Morton, Taylor and Adams
ATTORNEYS

3,679,331

METERING PUMP AND VALVE

BACKGROUND OF THE INVENTION

There is a need for a metering pump which can deliver multiple individual amounts of different fluids which then can be blended automatically in predetermined proportions for analysis of one or more of said amounts. For example, it may be advantageous to continuously monitor a chemical process by withdrawing therefrom a sample of the product which is then analyzed automatically by being mixed with predetermined quantities of chemical constituents necessary to perform the analysis. Needless to say, it is extremely important, particularly where the sample or other chemical constituents selected are very small, for each to be very accurately measured. It is furthermore very important for a metering pump to have long life and for such changes which occur due to wear, not to affect its metering capabilities.

The foregoing criteria have not been met by prior art metering pumps. In general these have failed to provide the necessary accuracy since the principle or mode of their operation has been such as to produce too great a margin of error between successive discrete quantities of fluid which cannot be tolerated for automatic analysis work. A further disadvantage has been a tendency for such pumps to break down or wear out prematurely under continued operation.

SUMMARY OF THE INVENTION

According to the present invention, there is provided a metering pump and valve combination highly suitable for automatic chemical analysis which operates by flexing a plurality of resilient tubes. The manner of flexing each tube is such that the elastic limit of each is never exceeded while in combination therewith a simple, one-way valve system assures positive displacement of all fluid which is trapped in each tube during flexure. Means are further provided for simultaneously flexing multiple tubes which may be of different diameters and which are independently adjustable for individual calibration.

These and other aspects of the invention are described in the following specification and the accompanying drawing.

DESCRIPTION OF A PREFERRED EMBODIMENT

Figure 1:
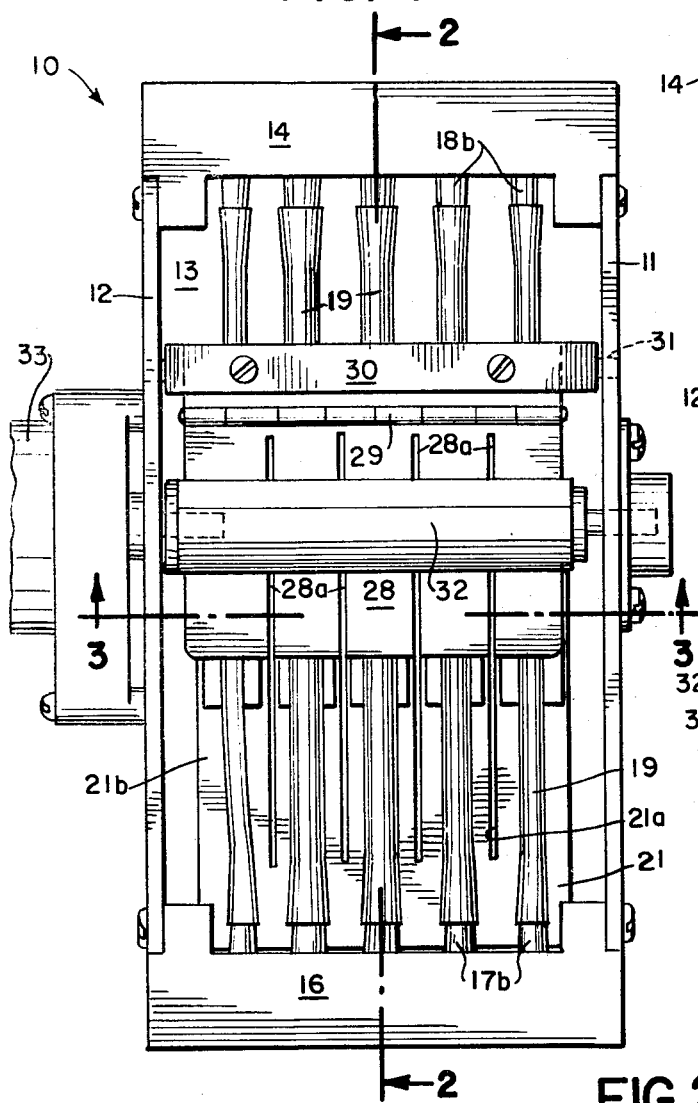
FIG. 1 is a back elevation of the metering pump and valve combination according to the present invention.

Referring to the drawing, a metering pump 10 has been illustrated which incorporates the principles of the present invention. The pump body includes a U-shaped casing having sides 11 and 12 and a front 13. The casing is secured by screws to end block 14 and 16. Within block 16 are a plurality of elbows 17 having external coupling ends 17a for the ingress of sampling fluid and internal coupling ends 17b. Similarly, block 14 secures a plurality of outlet elbows 18 having outlet coupling ends 18a and internal ends 18b.

Each of the elbows 17 and 18 are connected by their internal ends 17b, 18b to tubes 19 which, in the illustrated embodiment are of a suitable resilient plastic material. Immediately adjacent to an intermediate length of each tube 19 is a support block 20 to which the adjacent tube section is bounded by a silicone adhesive (not shown) for example; however, the use of an adhesive in all instances is not necessary.

Mounted to the front plate 13 of the pump 10 is a member 21 having a series of vertical grooves 21a therein which define fingers 21b. Each finger 21b will mount a block 20. Adjustment of a finger 21b toward or away from the front plate 13 can be effected by individual adjusting screws 22, each having a lock-nut 22a.

Within each tube 19 is an inlet valve 23 having a seat 23a adapted to cooperate with a disc 24 in the well-known manner. Similarly, a second outlet valve 26 having a seat 26a cooperates with a disc 27.

Immediately adjacent to one side of each tube 19 is a presser plate 28 hinged at 29 to a mounting block 30. The block 30 is rotatable about pin 31. In the particular embodiment illustrated, the presser plate 28 is divided into segments or fingers 28a each of which bears against one of the individual tubes 19. Thus, adjustment of each tube 19 by adjusting screws 22 can be accomplished without interfering with the calibration of an adjacent tube since fingers 28a isolate each tube contacting part of the presser plate 28. A cam 32 contacts the side of the presser plate 28 opposite to tubes 19. The cam 32 can be rotated by a motor 33 to move cam surfaces 32a against the plate 28 in order to flex each tube 19 transversely in a prescribed amount. The resiliency of the tubes 19 will return presser plate 28 toward cam 32.

The operation of the metering pump described above is as follows: Several or all of the inlet elbows 17 will first be connected to different sources of fluid. For example, one of the inlets 17 may be attached on-stream to receive the product of a chemical process which is to be continuously monitored. Others of the inlets 17 may be connected to chemical constituents which are subsequently to be mixed in predetermined amounts with the sample fluid of the chemical process. With each of the tubes 19 filled with respective fluids from different sources, the operation of motor 33 will cause rotation of cam 32 in the direction of the arrow. Cam surfaces 32a will urge the presser plate 28 toward each tube 19 and cause flexure thereof in a transverse direction (as shown in dotted lines). However, at no time will such flexure exceed the elastic limit of a tube. Control of this aspect will be determined by the shape of the cam 32, its location, and the placement of presser plate 28 with respect to tubes 19. During hinged movement of plate 28, block 30 can rotate about pin 31.

Figure 2:
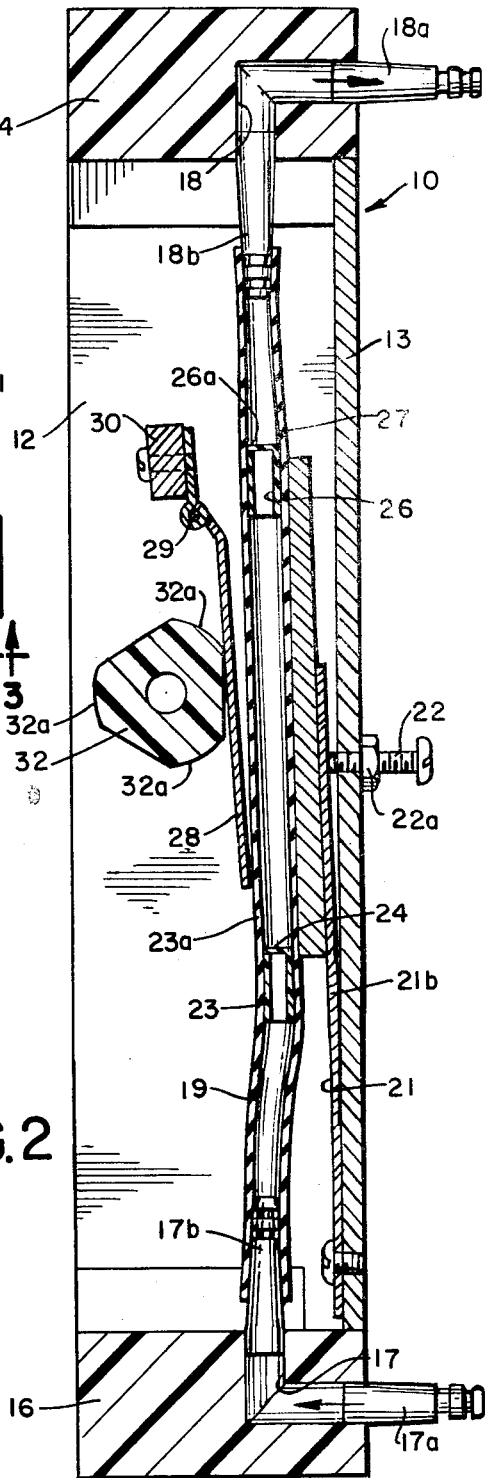
FIG. 2 is a cross-section of the pump of FIG. 1 taken in the direction of arrows 2—2 of FIG. 1.

Upon flexure of each tube 19 a precise quantity of fluid trapped in each tube 19 between discs 24 and 27 will be positively ejected from each tube. Upon release of the tube by return of the presser plate 28 to the position shown in FIG. 2, a like quantity of fluid will be drawn into the section of the tube intermediate discs 24 and 27. In this way identical, measured amounts of fluid will be metered and pumped during successive rotations of cam 32.

Figure 3:
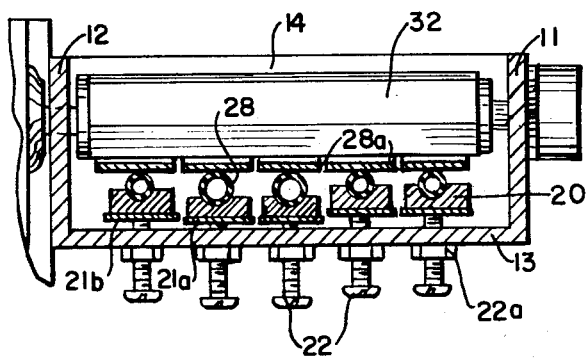
FIG. 3 is a cross-section of the pump of FIG. 1 taken in the direction of arrows 3—3 of FIG. 1.

It will be observed as best seen in FIG. 3 that each of the tubes 19 may be set independently with respect to the presser plate 28. Different diameter tubes for pumping different discrete quantities of fluid can therefore be accommodated quite readily by the pump of the invention. Furthermore, individual calibration of each tube is readily accomplished.

The metering pump of the invention is extremely reliable and will pump intermittent slugs of fluid each of a predetermined amount within an accuracy of 1 or 2 percent. Although wear of the tubes 19 is minimized, and in fact, the metering pump of the invention will have very long life, such wear as will occur will be substantially equal for each tube and therefore the proportions of each metered quantity of fluid, from respective tubes will remain the same. Thus mixtures of the separate metered quantities should continue to produce the analytical result.

It will be understood that the foregoing description is of a particular embodiment and is therefore representative. In order to appreciate fully the scope of the invention, reference should be made to the appended claims.

I claim:

1. A metering pump comprising:
   a. a pump body having a plurality of fluid inlet and outlet means;
   b. a resilient walled tubular conduit connected between each inlet and outlet means, the wall of each of said conduits being flexible in a direction transverse to its length;
   c. separate rigid support means for each conduit extending lengthwise along one side thereof;

d. valve means connected to each of said conduits for admitting a discrete quantity of fluid thereto and for ejecting a quantity therefrom in response to flexing of said conduit;
e. presser plate means mounted on said pump body adjacent to and on the side of said conduits opposite said support means, said presser plate means having separate segments aligned with each of said conduits for movement independently of each other into contact with the aligned conduits;
f. selectively operable cam means for moving the segments of said presser plate means against the aligned conduits to flex said conduits transversely; and
g. means for independently adjusting and fixing the positions of the support means for each of said conduits relative to said presser plate means.

2. The pump according to claim 1 wherein:
a. said cam means comprises a single cam element rotatably mounted for movement into simultaneous contact with each of the segments of said presser plate means.

* * * * *